United States Patent

Sakamoto

[11] Patent Number: 5,854,526
[45] Date of Patent: Dec. 29, 1998

[54] THREE-PHASE PERMANENT-MAGNET ELECTRIC ROTATING MACHINE

[75] Inventor: Masafumi Sakamoto, Kiryu, Japan

[73] Assignee: Japan Servo Co., Ltd., Tokyo-to, Japan

[21] Appl. No.: 678,757

[22] Filed: Jul. 11, 1996

[51] Int. Cl.$^6$ ............ H02K 1/12; H02K 21/12; H02K 21/14; H02K 21/16

[52] U.S. Cl. ............ 310/254; 310/162; 310/179

[58] Field of Search ............ 310/49 R, 67 R, 310/162, 164, 156, 179, 193, 254, 257

[56] References Cited

U.S. PATENT DOCUMENTS

| | | | |
|---|---|---|---|
| 2,484,001 | 10/1949 | Raymond | 310/254 |
| 2,518,756 | 8/1950 | Cochran | 310/164 |
| 3,226,584 | 12/1965 | Pintell | 310/162 |
| 3,952,219 | 4/1976 | Mitsui et al. | 310/156 |
| 4,029,980 | 6/1977 | Gamble et al. | 310/112 |
| 4,051,401 | 9/1977 | Hayward | 310/216 |
| 4,206,374 | 6/1980 | Goddijn | 310/49 R |
| 4,347,457 | 8/1982 | Sakamoto | 310/256 |
| 4,384,226 | 5/1983 | Sato et al. | 310/89 |
| 4,503,368 | 3/1985 | Sakamoto | 310/49 R |
| 4,620,120 | 10/1986 | Laing | 310/164 |
| 4,672,253 | 6/1987 | Tajima et al. | 310/49 R |
| 4,675,564 | 6/1987 | Isozaki | 310/49 R |
| 4,764,697 | 8/1988 | Christiaens | 310/49 R |
| 4,764,698 | 8/1988 | Murakami | 310/254 |
| 4,949,000 | 8/1990 | Petersen | 310/179 |
| 4,983,867 | 1/1991 | Sakamoto | 31/49 R |
| 4,999,559 | 3/1991 | Katz | 310/49 R |
| 5,032,747 | 7/1991 | Sakamoto | 310/49 R |
| 5,128,570 | 7/1992 | Isozaki | 310/49 R |
| 5,243,246 | 9/1993 | Sakamoto | 310/179 |
| 5,289,064 | 2/1994 | Sakamoto | 310/49 R |
| 5,298,825 | 3/1994 | Oudet et al. | 310/156 |
| 5,386,161 | 1/1995 | Sakamoto | 310/49 R |
| 5,410,200 | 4/1995 | Sakamoto et al. | |

FOREIGN PATENT DOCUMENTS

| 1-114359 | 5/1989 | Japan | 310/254 |
|---|---|---|---|

*Primary Examiner*—Clayton LaBalle
*Attorney, Agent, or Firm*—Oblon, Spivak, McClelland, Maier & Neustadt, P.C.

[57] ABSTRACT

A three-phase permanent-magnet electric rotating machine having necessary performance which can be realized easily at a low cost, wherein a stator includes a stator iron core having a disc portion and 3n magnetic poles formed so as to be erected at right angles from an outer circumference of the disc portion, and excitation windings mounted on the magnetic poles so as to have a predetermined width in the axial direction, and wherein a rotor is constituted by permanent magnets magnetized into N and S poles arranged alternately in the direction of rotation of the rotor and the rotor is supported so as to face the top ends of the respective magnetic poles of the stator through a predetermined air gap. In this case, the number n is an integer not smaller than 1. Alternatively, n may be selected to be an even number not smaller than 2 so that the excitation windings may be mounted on every other one of the magnetic poles. Preferably, a plurality of magnetic teeth of a predetermined shape may be formed on each of the top end portions of the magnetic poles formed in the stator iron core. Further preferably, excitation windings are mounted on first and second stator iron cores which are doubly arranged so as to be concentric with each other to thereby form a stator provided with a double structure of the magnetic poles.

12 Claims, 14 Drawing Sheets

| SEQUENCE | I | II | III | IV | V | VI |
|---|---|---|---|---|---|---|
| 1 | + | − | / | + | − | / |
| 2 | / | − | + | / | − | + |
| 3 | − | / | + | − | / | + |
| 4 | − | + | / | − | + | / |
| 5 | / | + | − | / | + | − |
| 6 | + | / | − | + | / | − |
| 7 | + | − | / | + | − | / |
| . | . | . | . | . | . | . |

| SEQUENCE | 2-I | 2-II | 2-III |
|---|---|---|---|
| 1 | + | − | − |
| 2 | + | + | − |
| 3 | − | + | − |
| 4 | − | + | + |
| 5 | − | − | + |
| 6 | + | − | + |
| 7 | + | − | − |
| . | . | . | . |

THREE-PHASE PERMANENT-MAGNET ELECTRIC ROTATING MACHINE

BACKGROUND OF THE INVENTION

1. Field of the Invention

The present invention relates to a three-phase permanent-magnet electric rotating machine, and particularly to a three-phase permanent-magnet electric rotating machine in which necessary performance can be formed easily at a low cost.

2. Description of the Related Art

For example, a conventional three-phase permanent-magnet electric rotating machine (hereinafter referred to as electric rotating machine) forms a structure constituted by the arrangement of parts as shown in FIG. 23.

FIG. 23 is an exploded perspective view showing an example of the electric rotating machine.

In FIG. 23, a bobbin 22 wound with a stator winding 21 is mounted between two cup-type stator iron cores 20 arranged so as to be opposite to each other and each having a predetermined number of magnetic poles 20a erected perpendicularly to thereby form a one-phase stator $A_1$. Three stators $A_1$ to $A_3$ including other two stators $A_2$ and $A_3$ formed in the same manner as described above are piled up coaxially to thereby form a stator A.

Further, a predetermined gap with respect to the magnetic pole surface of the stator is provided in the inside of the stator A constituting a circular space so that a cylindrical rotor B having magnetic poles N and S of permanent magnets alternately formed on its surface is rotatably supported by a shaft bearing portion 24a provided in the center portion of a casing 23 and a shaft bearing portion 24a provided in the center portion of a cover plate 24 by which the stator A is fixed into the casing 23.

In the case of an electric rotating machine having the aforementioned conventional configuration, the following problems arise.

(1) At the time of manufacturing, it is necessary that six stator iron cores 20 and three stator windings 21 wound on three bobbins are arranged coaxially and that magnetic poles 20a of each of the stator iron cores 20 are adjusted to be arranged in correct predetermined positional relations.

(2) Further, because production and assembling of a large number of parts as shown in the drawing require a large number of steps and a large deal of skill, the cost thereof increases.

(3) It is difficult to improve revolving accuracy.

(4) It is difficult to increase torque without increase of the volume (external size) of the electric rotating machine.

An object of the present invention is to solve the aforementioned problems in the prior art, that is, to provide a three-phase permanent-magnet electric rotating machine low in cost, improved in producing accuracy, capable of increasing torque and good in performance.

SUMMARY OF THE INVENTION

To solve the aforementioned problems, according to a first aspect of the present invention, there is provided a three-phase permanent-magnet electric rotating machine which comprises: a stator which includes a stator iron core made from a magnetic material and having a disc portion and 3n magnetic poles erected perpendicularly from an outer circumference of the disc portion, and excitation windings mounted on the magnetic poles respectively or on every other one of the magnetic poles, each of the windings having a predetermined width in an axial direction; and a rotor having permanent magnets by which a predetermined number of pairs of N and S magnetic poles are formed alternately in a direction of rotation of the rotor and so as to be opposite to the magnetic poles piercing the excitation windings at top end portions of the magnetic poles respectively beyond the excitation windings. The number n being selected to be an integer not smaller than 1 in the case where the excitation windings are mounted on all the magnetic poles respectively while it is selected to be an even number not smaller than 2 when the excitation windings are mounted on every other one of the magnetic poles.

According to a second aspect of the present invention, there is provided a three-phase permanent-magnet electric rotating machine which comprises: a stator which includes: a first stator iron core made from a magnetic material, and having a first disc portion, and 3n first magnetic poles erected perpendicularly from an outer circumference of the first disc portion; a second stator iron core made from a magnetic material, and having a second disc portion having a diameter which is smaller than a diameter of the first disc portion, and 3n second magnetic poles erected perpendicularly from an outer circumference of the second disc portion so that the 3n second stator iron cores are disposed concentrically with the 3n first magnetic poles so as to form 3n pairs of first and second magnetic poles; and excitation windings mounted on the pairs of first and second magnetic poles respectively or mounted on every other one of the pairs of first and second magnetic poles, each of the windings having a predetermined width in an axial direction; and a rotor having outer and inner circumferential surfaces on each of which a predetermined number of pairs of N and S magnetic poles are alternatively formed by permanent magnets in a direction of rotation of the rotor, the rotor being rotatably supported so that the pairs of N and S magnetic poles provided on the outer and inner circumferential surfaces of the rotor face the first poles of the first stator iron core and the second poles of the second stator iron core at predetermined air gaps respectively at top end portions of the first and second poles beyond positions where the excitation windings are mounted. The number n being selected to be an integer not smaller than 1 in the case where the excitation windings are mounted on all the magnetic poles respectively while it is selected to be an even number not smaller than 2 when the excitation windings are mounted on every other one of the magnetic poles.

In the above three-phase permanent-magnet electric rotating machine, preferably, pole teeth are formed on a top end portion of each of the magnetic poles by providing a plurality of slots in a predetermined shape in the top end portion.

In the above three-phase permanent-magnet electric rotating machine, preferably, the magnetic poles on which the windings of the stator are mounted respectively are arranged so as to be concentric with the magnetic poles on which the windings are not mounted and so as to be located radially inner side than the magnetic poles on which the windings are not mounted; the magnetic poles on which the windings are not mounted are integrally extended directly in a axial direction of rotation of the rotor to thereby form first claw poles; second claw poles formed separately are magnetically and mechanically connected to the respective magnetic poles on which the windings are mounted; the first claw poles and the second claw poles are arranged on one and the same circle; and the rotor is rotatably supported so as to face the first and second claw poles.

According to a third aspect of the present invention, there is provided a three-phase permanent-magnet electric rotating machine which comprises: a stator including: a disc portion of a magnetic substance; 3n (n being an integer not smaller than 1) magnetic poles each of which is formed from a magnetic substance and bent like a U-shape so that each of the magnetic poles has long and short sides parallel with each other and a side connecting the long and short sides to each other, free ends of the long sides of the respective magnetic poles being magnetically and mechanically connected to the disc portion so as to be erected perpendicularly to the disc portion at its outer circumferential portion, the short sides of the respective magnetic poles being arranged as claw poles radially inner sides than the long sides respectively; and excitation windings mounted on the magnetic poles, each of the windings having a predetermined width in an axial direction; and a rotor constituted by permanent magnets so that a predetermined number of pairs of S and N magnetic poles are arranged alternately in a direction of rotation of the rotor so as to face the claw poles of the magnetic poles through a predetermined air gap.

According to a fourth aspect of the present invention, there is provided a three-phase permanent-magnet electric rotating machine which comprises: a stator including: a disc portion of a magnetic substance; 3n (n being an even number not smaller than 2) magnetic poles each of which is formed from a magnetic substance and bent like a U-shape so that each of the magnetic poles has long and short sides parallel with each other and a side connecting the long and short sides to each other, free ends of the long sides of the respective magnetic poles being magnetically and mechanically connected to the disc portion so as to be erected perpendicularly to the disc portion at its outer circumferential portion, the short sides of the respective magnetic poles being arranged as claw poles radially inner sides than the long sides respectively; and excitation windings mounted on every other one of the magnetic poles, each of the windings having a predetermined width in an axial direction; and a rotor constituted by permanent magnets so that a predetermined number of pairs of S and N magnetic poles are arranged alternately in a direction of rotation of the rotor so as to face the claw poles of the magnetic poles through a predetermined air gap.

According to a fifth aspect of the present invention, there is provided a three-phase permanent-magnet electric rotating machine which comprises: a stator including: a cup-shaped body of a magnetic substance constituted by a disc-like bottom portion and a cylindrical side portion, 3n (n being an integer not smaller than 1) magnetic pole yokes, and excitation windings mounted on the yokes respectively, each of the magnetic pole yokes having a flat portion and a plurality of claw pole portions bent at one end of the flat portion to erect at right angles to extend in directions opposite to each other alternately, or each of the magnetic pole yokes being constituted by two yoke portions each of which has a flat portion and a plurality of claw pole portions bent at one end of the flat portion to erect to extend in one direction and which are piled up one on the other so that the claw pole portions of the two coincide with each other, the flat portions of the magnetic pole yokes being made parallel with the disc-like bottom portion and the other ends of the magnetic yokes being magnetically and mechanically connected to the cylindrical side portion so that the excitation windings carried by the magnetic pole yokes respectively are circumferentially disposed and so that axial centers of the windings are extended radially inward at a nearly center of an axial height of the cylindrical side portion; and a rotor rotatably supported so as to be opposite to the claw poles of the magnetic pole yokes of the stator through predetermined air gaps, the rotor being magnetized so as to have N and S magnetic pole pairs arranged, at circumferentially equal pitches substantially identical with pitches of the claw poles, on each of two stages in an axial direction of rotation, the circumferential arrangement of the N and S magnetic pole pairs on one of the two stages being circumferentially shifted by ½ pitch from the circumferential arrangement of the N and S magnetic pole pairs on the other of the two stages, or the rotor being magnetized so as to have N and S magnetic pole pairs arranged at circumferentially equal pitches substantially identical with pitches of the claw poles on one stage.

According to a sixth aspect of the present invention, there is provided a three-phase permanent-magnet electric rotating machine comprising a stator and a rotor supported so as to be rotatable relative to the stator, the stator including 3n (n being an integer not smaller than 1) magnetic poles on which excitation windings are mounted respectively and which are arranged circularly on one circle, each of the magnetic poles having first and second flat portions extended perpendicularly to an axis of rotation of the rotor, and first and second groups of claw poles which are equal in number between the first and second groups, and which are extended parallelly to the axis of rotation of the rotor at one ends of the first and second flat portions respectively so that the claw poles of the first and second groups are circularly arranged on one circle, the claw poles of the first group and the claw poles of the second group are arranged alternately so that the first group of claw poles and the second group of claw poles are capable of being excited by the excitation windings so as to have polarities opposite to each other, and the rotor having a surface facing the claw poles of the first and second groups at a predetermined air gap, the surface being magnetized into N and S magnetic poles alternately in a direction of rotation of the rotor.

According to a seventh aspect of the present invention, there is provided a three-phase permanent-magnet electric rotating machine which comprises a stator and a rotor supported so as to be rotatable relative to the stator, the stator including 3n (n being an integer not smaller than 1) excitation windings mounted on a yoke disposed within an inner space of the rotor, and claw poles arranged on an outer circumferential side of the rotor so as to face the rotor at a predetermined air gap, the yoke and the claw poles being magnetically short-circuited.

According to an eighth aspect of the present invention, there is provided a three-phase permanent-magnet electric rotating machine which comprises a stator and a rotor supported so as to be rotatable relative to the stator, the stator including 3n (n being an integer not smaller than 1) excitation windings mounted on a yoke disposed within an inner space of the rotor, and claw poles arranged on outer and inner circumferential sides of the rotor so as to face inner and outer surfaces of the rotor at predetermined air gaps respectively, and the inner and outer surfaces of the rotor being magnetized so that N and S magnetic poles are arranged circumferentially alternately, the number of pairs of N and S magnetic poles is equal to each other between the inner and outer surfaces of the rotor, so that lines of magnetic flux from the inner and outer surfaces of the rotor are short-circuited through a magnetic path formed by a magnetic substance constituting the yoke after making interlinkage with the excitation windings.

In the above three-phase permanent-magnet electric rotating machine, preferably, the top end portions of the magnetic poles formed in the stator iron core are fixedly held by an end plate of a non-magnetic substance so that the rotor is rotatably supported by shaft bearings provided in a center portion of the end plate and in a center portion of a disc portion constituting the stator, respectively.

In the above three-phase permanent-magnet electric rotating machine, preferably, the rotor includes an axially magnetized cylindrical permanent magnet, and first and second rotor iron cores each of which has a predetermined number of claw-pole-shaped magnetic poles formed at intervals of a predetermined pitch and integrally fixed at their one ends, the first and second rotor iron cores being coupled with the cylindrical permanent magnet from axially opposite sides of the cylindrical permanent magnet so that the magnetic poles of the first rotor iron core and the magnetic poles of the second rotor iron core are disposed side by side alternately in the direction of rotation of the rotor and so that the magnetic poles of the first rotor iron core and the magnetic poles of the second rotor iron core are formed to be N and S magnetic poles respectively.

DESCRIPTION OF THE PREFERRED EMBODIMENTS

Embodiments 1 to 13 according to the present invention will be described in detail with reference to FIGS. 1 through 20, FIGS. 21A and 21B and FIGS. 22A and 22B.

Embodiment 1

Figure 1:
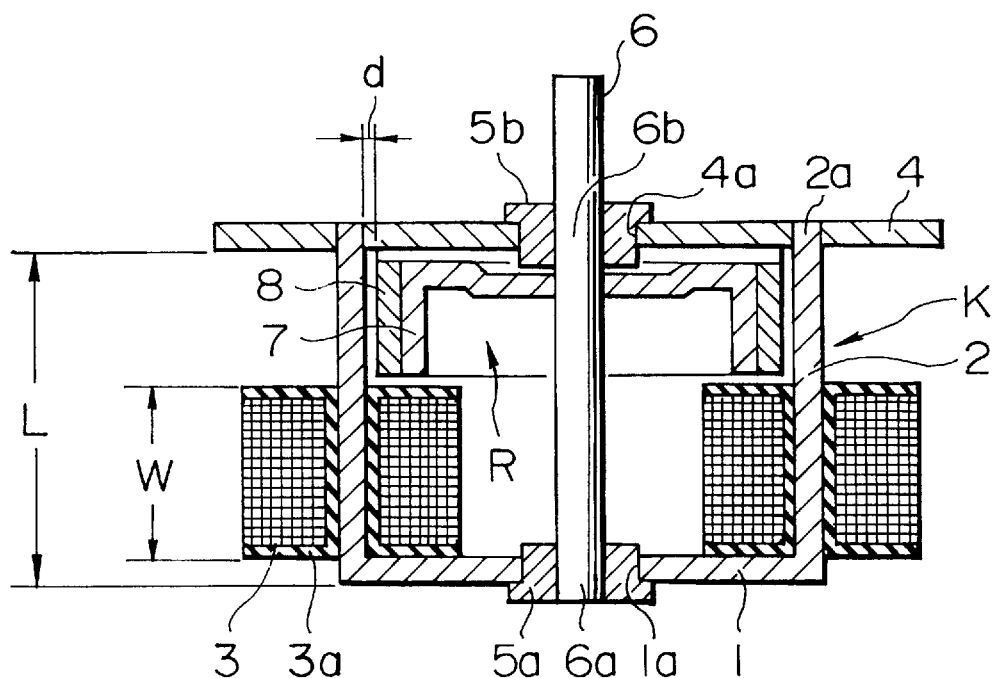
FIG. 1 is a side sectional view of a three-phase permanent-magnet electric rotating machine produced according to the present invention.
Figures 2, 3:
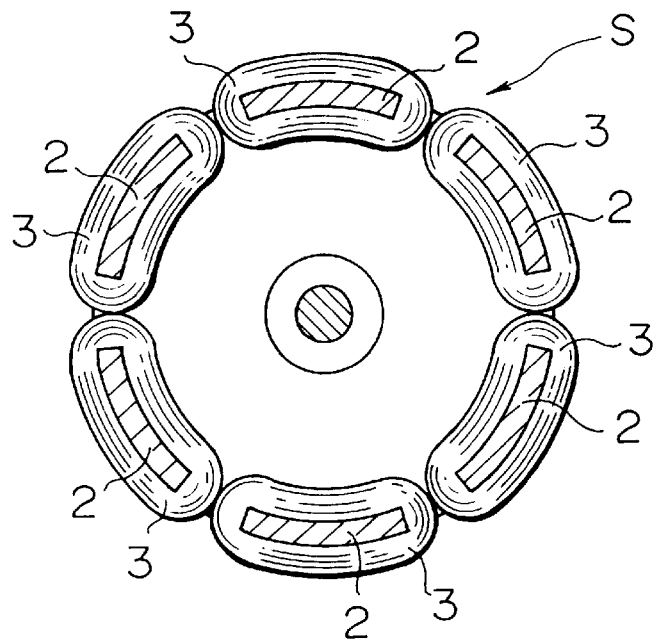
FIG. 2 is a schematic sectional view of the stator of Embodiment 1 when viewed from the magnetic pole side.
FIG. 3 is a view of excitation sequence for explaining the operation of Embodiment 1.

FIG. 1 shows a structural sectional example of a three-phase permanent-magnet electric rotating machine to be referred to for explaining the following embodiments. FIG. 2 shows the shape of a stator in a top view in the three-phase six-pole permanent-magnet electric rotating machine shown in Embodiment 1.

In FIGS. 1 and 2, the reference character K designates stator iron cores. Each of the stator iron cores K is formed from a magnetic material plate having a predetermined thickness. The stator iron core K has a disc portion 1, and six magnetic poles 2 erected perpendicularly from the disc portion 1, preferably at circumferentially equal pitches. A bobbin 3a provided with an excitation winding 3 having a width W about half the length of each the magnetic pole 2 from the disc portion 1 is fitted onto the magnetic pole 2.

Further, a leading end portion 2a of each of the magnetic poles 2 is fixedly connected to an end plate 4 of a non-magnetic material.

Shaft bearings 5a and 5b are attached in holes 1a and 4a provided in the center portion of the disc portion 1 of the stator iron core K and in the center portion of the end plate 4 respectively so that a rotation shaft 6 is rotatably supported by the two shaft bearings 5a and 5b.

A rotor R having a predetermined shape is fixed to the rotation shaft 6. A plurality of axially elongated permanent magnets 8 or equivalent functions which are arranged so that a predetermined number of pairs of N and S poles are alternately formed in the direction of the rotation of the rotor R and on the surface of a back yoke 7 forming a rotor hub are formed so as to be opposite to the magnetic pole portions 2 with a predetermined distance d.

The number of permanent magnet pole pairs in the rotor relative to the number of magnetic poles in the stator is set suitably correspondingly to the structure and required characteristic of the electric rotating machine in the same manner as in the conventional three-phase permanent-magnet electric rotating machine.

For example, in the case where the number of magnetic poles is six as shown in this embodiment, the number of permanent magnet pole pairs in the rotor is set to eight.

Generally, when the number of permanent magnet pole pairs in the rotor and the number of phases in the stator are set to Zr and M respectively, the step angle θ of rotation of the electric rotating machine formed as a stepping motor is given by the following equation (1) as known well.

$$\theta = 360°/2 \times M \times Zr \quad (1)$$

Accordingly, when the number M of phases and the number Zr of permanent magnet pole pairs are 3 and 8 respectively in this embodiment, the step angle θ is given by the following equation.

$$\theta = 360°/2 \times 3 \times 8 = 7.7°$$

An example of driving of the electric rotating machine having the aforementioned configuration will be described with reference to FIGS. 3 and 4. That is, FIG. 3 shows an example of a driving sequence up to the step 7 in the case of two-phase excitation for a three-phase permanent-magnet type stepping motor, and FIG. 4 shows the relations between magnetic poles in the stator and N and S poles of permanent magnets in the rotor in the condition in which the electric rotating machine is developed up to the step 7 showing the state of rotation of the rotor corresponding to the driving sequence shown in FIG. 3.

In FIG. 3 showing the driving sequence, the numbers I to VI indicating the order of arrangement of six windings are written in the row, and the excitation step numbers 1 to 7 are written in the column. In the respective frames of intersection between the column and the row, the symbol + represents excitation current supply to excitation windings in a predetermined direction defined correspondingly to the winding direction of the excitation windings provided in the electric rotating machine and correspondingly to the direction of the rotation of the electric rotating machine, and the symbol − represents excitation current supply in a direction reverse to the defined direction.

Because the number of poles in this embodiment is six, excitation windings for pole numbers I and IV, for pole numbers II and V and for pole numbers III and VI shown in the drawing are connected in parallel to each other so that an excitation current is supplied from one and the same excitation circuit respectively.

Figure 4:
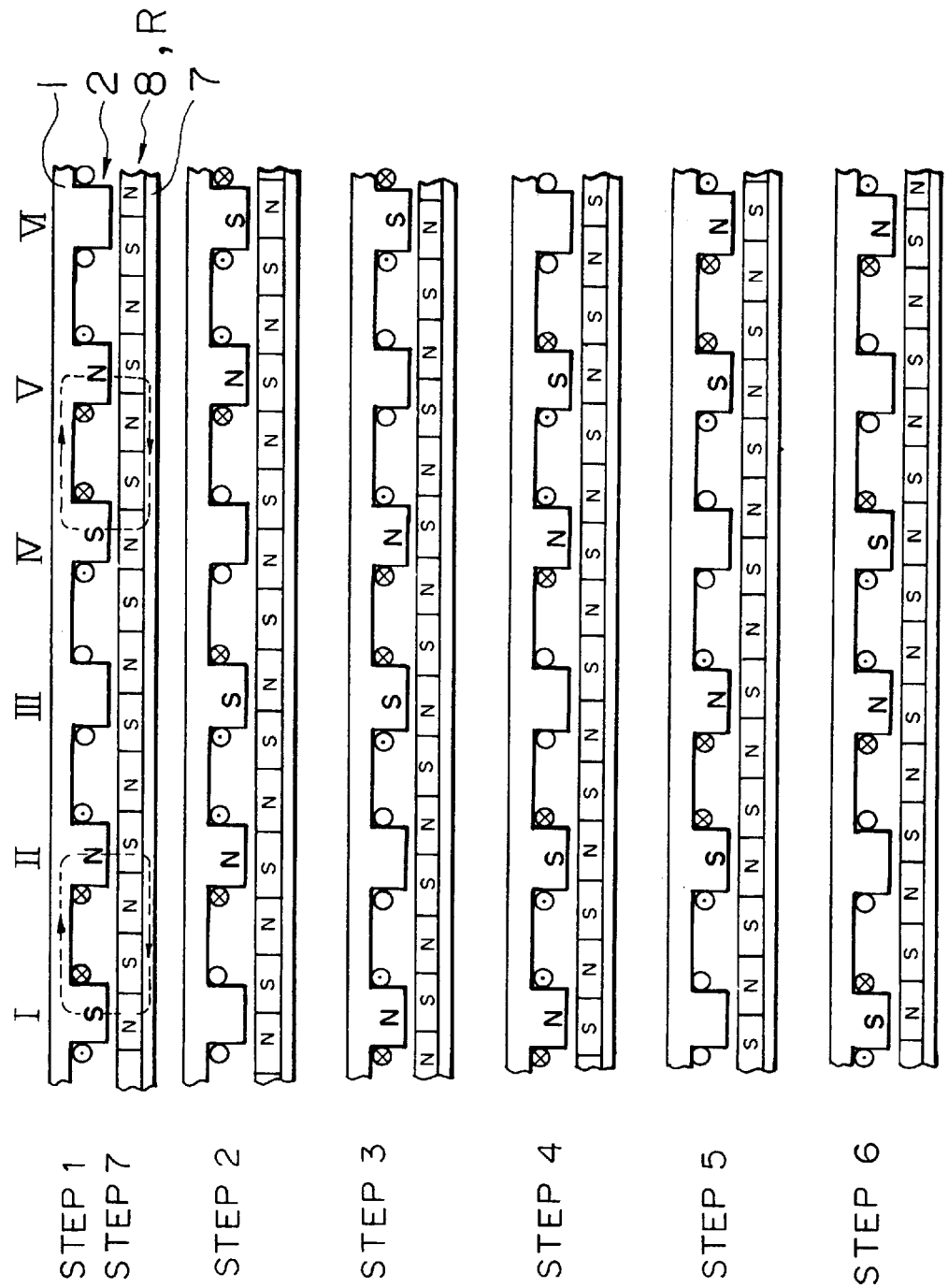
FIG. 4 is a development explanatory view for explaining the positional relations between the magnetic poles of the stator and the magnetic pole pairs of the rotor at the time of execution of the excitation sequence shown in FIG. 3.

In FIG. 4 showing a development view, six stator magnetic poles numbered correspondingly to the numbers of the excitation windings shown in FIG. 3 are shown in the columns, and a development view of the disc portion 1 as a stator and the permanent magnets 8 as a rotor R in respective excitation steps up to the step 7 is shown in the lines. Incidentally, in this case, the view of the step 1 is used for the step 7 because the situation of the step 7 is quite the same as the situation of the step 1.

Further, the symbol ○ written in the left or right of each pole designates an excitation winding, the symbol · written in the symbol ○ designates the current flow from the back to the front with respect to the paper, the symbol × written in the symbol ○ designates the current flow from the front to the back with respect to the paper, the symbol S written in a magnetic pole designates an S pole created in the magnetic pole by the aforementioned excitation current, and the symbol N written in a magnetic pole designates an N pole created in the magnetic pole by the aforementioned excitation current.

Because the electric rotating machine shown in this embodiment is a three-phase six-pole armature, excitation in the step 1 is performed so that excitation currents in the direction of + are supplied to the winding numbers I and IV and that excitation currents in the reverse direction, that is, in the direction of − are supplied to the winding numbers II and V as exemplified in FIG. 3. Accordingly, as shown in FIG. 4, the poles I, II, IV and V are excited to the S, N, S and N poles respectively. The magnetic flux generated by excitation flows as represented by the broken line so that the magnetic flux out of the S pole of the magnetic pole I goes from the N pole of the magnetic pole II into a predetermined S pole of the rotor R opposite thereto via the disc portion 1 of the stator and returns from an N pole opposite to the magnetic pole I to the magnetic pole I through a back yoke 7.

Similarly, the magnetic flux out of the S pole of the magnetic pole IV goes from the N pole of the magnetic pole V into a predetermined S pole of the rotor R opposite thereto via the disc portion 1 of the stator and returns from an N pole opposite to the magnetic pole IV to the magnetic pole IV through the back yoke 7. The S and N poles of the rotor R are attracted to corresponding magnetic poles of the stator by this magnetic flux, so that the rotor R rotates.

Then, in step 2, the excitation current for the winding numbers I and IV is cut off and an excitation current is supplied to the winding numbers III and VI in the + direction while the excitation current is continuously supplied to the winding numbers II and V in the − direction. Hereinafter, the rotor R steps by the aforementioned step angle of 7.5° whenever excitation currents are switched in every step as shown in FIGS. 3 and 4.

As shown in FIG. 3, the step 1 and the step 7 are one and the same step. The operation from the step 1 to the step 6 is repeated if excitation currents are supplied at a necessary speed.

Next, a method of producing an electric rotating machine having the aforementioned configuration will be described.

Figure 5:
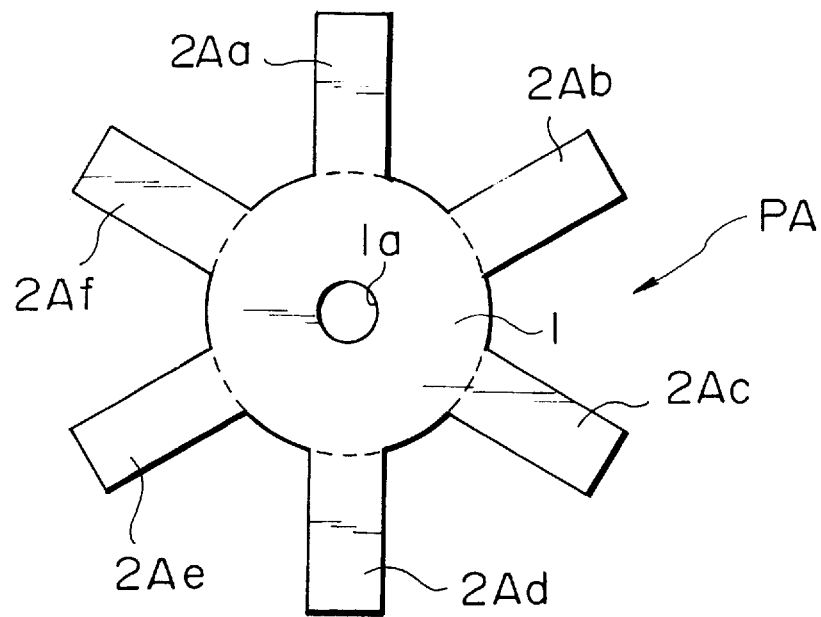
FIG. 5 is a plan view of a stator iron plate for explaining the structure of the stator of Embodiment 1.

FIG. 5 is a view of a stator iron core K before the stator iron core is formed as shown in FIG. 1.

That is, a stator iron plate PA showing the original form of the stator iron core K in FIG. 1 is formed by press-cutting a plate material of a magnetic substance having predetermined characteristic into the shape shown in FIG. 5 and providing six projection portions 2Aa to 2Af corresponding to the number of magnetic poles of the electric rotating machine to form magnetic poles 2 around the disc portion 1 provided with a hole 1a in its center portion to attach a shaft bearing 5a thereinto.

The diameter of the disc portion 1 is designed so that the rotor R as shown in FIG. 1 is held with separation of a predetermined gap d provided with respect to magnetic poles 2 in a space formed in the inside of the magnetic poles 2 when the magnetic poles 2 are formed by bending the projection portions 2Aa to 2Af as will be described later.

It is further preferable that the projection portions 2Aa to 2Af are quadrangles of the size satisfying the shape of the magnetic poles 2 required when the projection portions 2Aa to 2Af are bent along the circumference of the disc portion 1 and are formed with circumferentially equal pitches.

Each of the projection portions 2Aa to 2Af has a length for fitting a bobbin 3a provided with an excitation winding and has a length corresponding to the rotor R when magnetic poles 2 are formed as described above and assembled as will be described later.

The projection portions 2Aa to 2Af of the aforementioned stator iron plate PA are bent perpendicularly along the circumference of the disc portion 1 to thus complete a stator iron core K shown in FIG. 1. The inside of each of the bent projection portions 2Aa to 2Af is shaped like a circular arc having the same curvature radius as the outer circumference of the disc portion 1. The end portion of the bent projection portion is shaped like a circular arc so that its center is slightly lower than its opposite sides and that the height of the projection portion at the lowest position, that is, the length from the disc portion 1 satisfies at least the aforementioned necessary length.

Next, assembling steps will be described with reference to FIGS. 1 and 2. A shaft bearing 5a is attached into a hole 1a provided in the center portion of a stator iron core K, and a shaft bearing 5b is attached into a hole 4b provided in the center portion of an end plate 4. Shaft bearings for supporting the rotation shaft 6 of the rotor R are constituted by the shaft bearings 5a and 5b so that the rotor R is supported by these shaft bearings 5a and 5b.

Bobbins 3a wound with excitation windings 3 are fitted and fixed onto the projection portions 2Aa and 2Af, respectively, of the stator iron core K shown in FIG. 5 to form magnetic poles 2 (six magnetic poles being generically designated by the reference numeral 2).

As is obvious from FIG. 1, the rotor R is constituted by a back yoke 7 having permanent magnets fixed on its surface. The back yoke 7 is fixed to the rotor R at its one end 6a with separation of an axial length necessary for mounting of the excitation windings 3.

The one end 6a of the rotation shaft 6 is inserted into the shaft bearing 5a, and the other end 6b is inserted into the shaft bearing 5b attached to the end plate 4.

Further, the projecting circular end portions 2a of the magnetic poles 2 of the aforementioned stator iron core K are inserted into holes (not shown) which are formed in the end plate 4 so as to be shaped like a narrow circular arc. If necessary in accordance with design conditions, the circular end portions are further bent so as to be fixed thereat. Thus, the basic assembling of the electric rotating machine is completed.

Embodiment 2

Embodiment 2 of the stator iron core will be described with reference to FIG. 6. In this embodiment, like Embodiment 1, a view of the stator iron plate PB before the stator iron core of a three-phase six-pole permanent-magnet electric rotating machine is formed is shown so as to correspond to FIG. 5.

Figure 6:
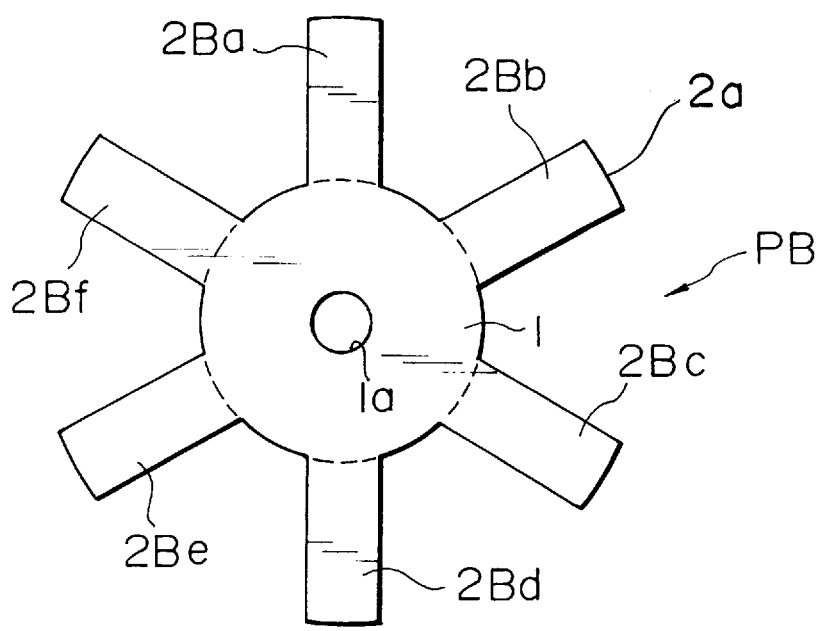
FIG. 6 is a plan view of a stator iron plate for explaining the stator of Embodiment 2.

As is obvious from comparison between FIGS. 6 and 5, the point of difference of this embodiment from Embodiment 1 is in that each of the top end portions 2a of six projection portions 2Ba to 2Bf is formed to be not a straight line like FIG. 5 but a circular arc having the same curvature radius as that of the disc portion 1 as shown in FIG. 6.

In this embodiment, accordingly, after the stator iron plate PB has been bent so that each of the magnetic poles has a section like a circular arc, the top end portion of each of the magnetic poles shaped not like a concave circular arc but like a straight line so that the whole of the top end portion exists in a plane parallel to the disc portion 1.

Embodiment 3

Embodiment 3 of the stator iron core will be described with reference to FIG. 7 and FIG. 1. In this embodiment, like Embodiment 1, a view of the stator iron plate PC before the stator iron core of a three-phase six-pole permanent-magnet electric rotating machine is formed is shown so as to correspond to FIG. 5.

Figure 7:
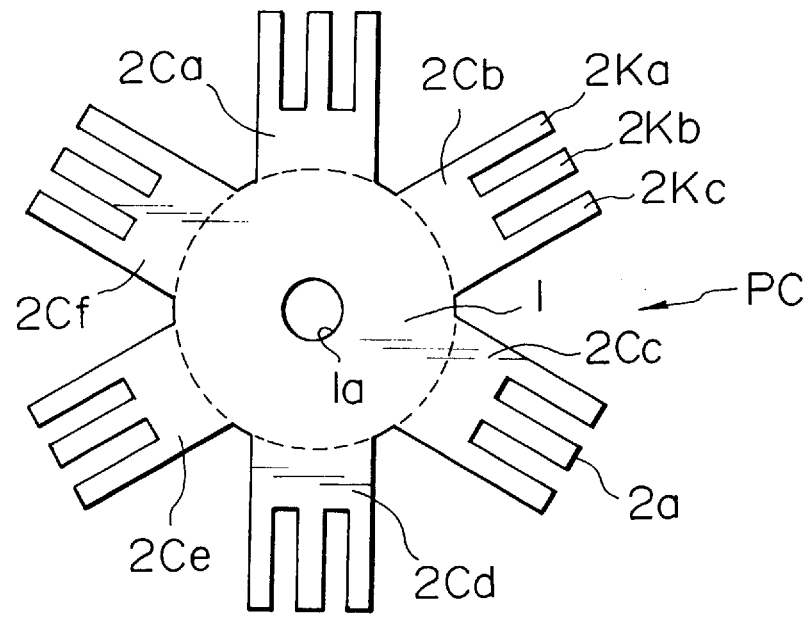
FIG. 7 is a plan view of a stator iron plate for explaining the stator with pole teeth of Embodiment 3.

As is obvious from comparison between FIGS. 7 and 5, the point of difference of this embodiment from Embodiment 1 is in that respective portions from the front ends of the six projection portions 2Ca to 2Cf, which become magnetic poles 2 (in FIG. 1), to the nearly centers thereof are shaped like comb teeth with a predetermined size and at intervals of a predetermined pitch. This embodiment shows the case of three comb teeth 2Ka to 2Kc.

Accordingly, three comb-teeth-like pole teeth 2ka to 2kc are formed in each magnetic pole 2 formed by bending.

Accordingly, the number of permanent magnet pole pairs in the rotor opposite to the stator having pole teeth is formed so as to correspond to the number of pole teeth.

Because the number of permanent magnet pole pairs in the electric rotating machine having such pole teeth can be increased, the step angle can be reduced as expressed by the equation (1).

The pitch and size of comb teeth provided in the aforementioned projection portions 2Ca to 2Cf are set so that the pitch and size of magnetic poles formed after bending are optimized. For example, though the pitch in the stator iron plate PC may be made equal if there is no problem in performance, the pitch or half pitch measured from the center position of each projection portion may be set so as to be substantially inversely proportional to the cosine of an angle between a line passing the pitch measurement point and perpendicular to the side line of the projection portion and a line passing the pitch measurement point and tangential to a circle concentric to the circle of the disc portion to thereby improve accuracy in the pitch of pole teeth after the formation of the stator.

Although the respective top end portions 2a of the projection portions 2Ca to 2Cf shown in FIG. 7 are shaped like a straight line in the same manner as in Embodiment 1, it is a matter of course that each of the end portions may be shaped like a circular arc by reference to Embodiment 2 so that the top end portions of finished pole teeth can be linearly shaped so that the whole of the top end portions are in a plane parallel to the disc portion 1.

Embodiment 4

Figure 8:
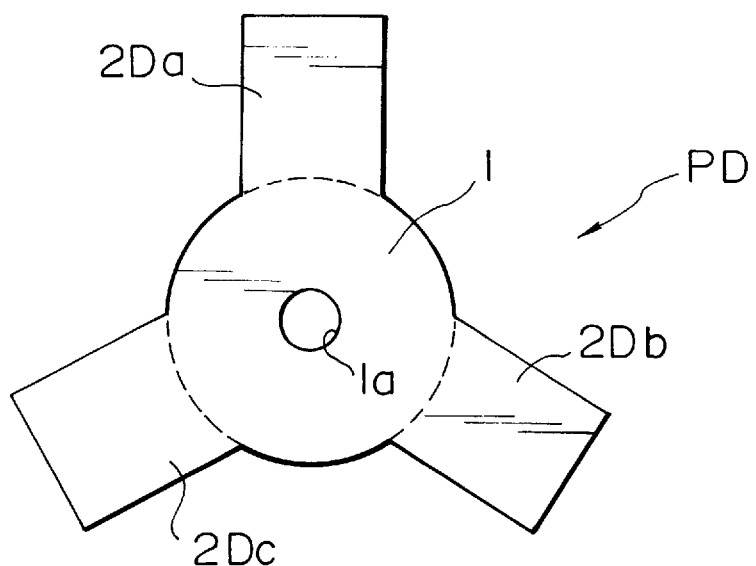
FIG. 8 is a plan view of a stator iron plate for explaining the stator of the three-phase three-pole permanent-magnet electric rotating machine of Embodiment 4.

Embodiment 4 in which the present invention is applied to a three-phase three-pole permanent-magnet electric rotating machine will be described with reference to FIG. 8. In FIG. 8, a view of the stator iron plate PD before the formation of the stator iron cores is shown so as to correspond to FIG. 7.

That is, the stator iron plate PD shows stator iron cores before processing of a three-phase three-pole permanent-magnet electric rotating machine without pole teeth. Three projection portions 2Da to 2Dc which become magnetic poles 2 are provided on the outer circumference of the disc portion 1.

The stator is formed by bending the projection portions and mounting excitation windings thereon in the same manner as in Embodiment 1. The stator is assembled with a rotor with permanent magnets having pole pairs of the number corresponding to the number, that is three, of the magnetic poles of the stator to thereby complete an electric rotating machine.

Although the respective top end portions of the projection portions 2Da to 2Dc shown in FIG. 8 are shaped like a straight line in the same manner as in FIG. 5, it is a matter of course that each of the top end portions may be shaped like a circular arc by reference to Embodiment 2 so that the top end portions of finished magnetic poles can exist in a plane parallel to the disc portion 1. Further, magnetic poles with pole teeth can be formed if comb teeth in which the size and pitch are optimized in the same manner as in Embodiment 3 are formed in advance.

Embodiment 5

Figure 9:
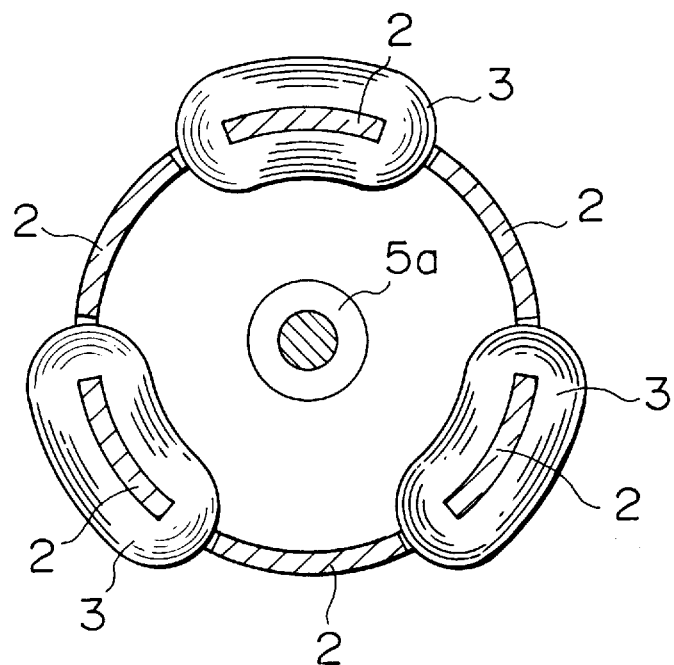
FIG. 9 is a schematic view of the stator of the electric rotating machine of Embodiment 5 in which each excitation winding is applied to every other magnetic pole in the stator, when viewed from the magnetic pole side.

Another embodiment of the electric rotating machine will be described with reference to FIG. 9. Embodiment 5 shows a three-phase six-pole permanent-magnet electric rotating machine in which stator iron cores and a rotator similar in shape to those in Embodiment 1 are used but each excitation winding 3 is mounted onto every other ones of six magnetic poles 2 as shown in FIG. 9. FIG. 9 corresponds to FIG. 2 for Embodiment 1, and FIG. 9 is a top view of the stator iron cores with excitation windings 3 mounted thereon.

Accordingly, the shape of the stator iron cores used in Embodiment 5 and the number of the permanent-magnet pole pairs in the rotor can be set suitably by reference to the above Embodiments 1 through 3 in accordance with the required specifications of the electric rotating machine and so on. Incidentally, the same reference numerals as those used in FIG. 2 are used for designating the stator iron cores in FIG. 9.

Figure 10:
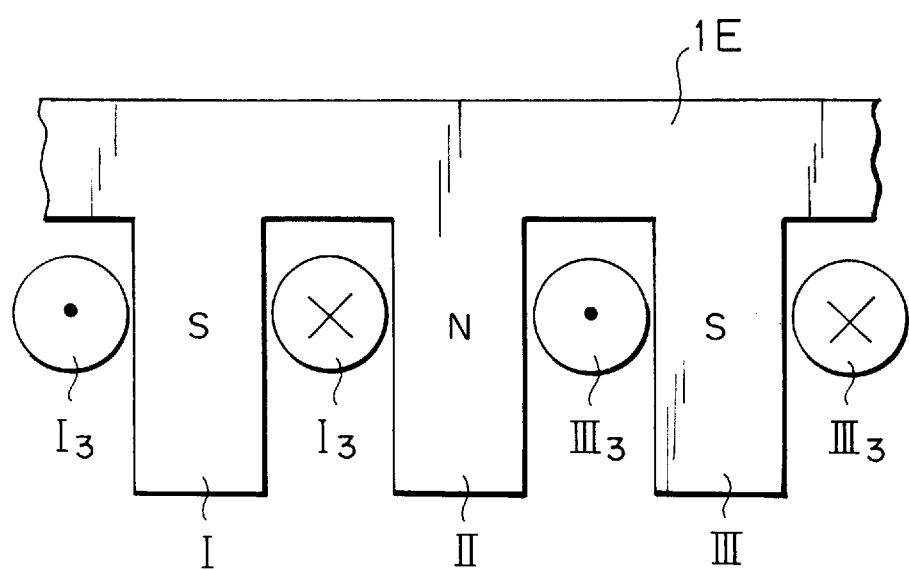
FIG. 10 is a partly development schematic view of the stator for explaining the operation of Embodiment 5.

In the electric rotating machine configured as described above, when in-phase excitation currents are supplied to two excitation windings simultaneously as shown in FIG. 10, magnetism is generated in magnetic poles having no excitation winding by the action of the excitation currents.

FIG. 10 is a development schematic view of an example of the electric rotating machine configured based on this embodiment. In FIG. 10, the symbol ○ designates excitation windings. Further, two magnetic poles I and III with excitation windings and a magnetic pole II with no excitation winding are exemplified.

In FIG. 10, I, II and III are the numbers given to the magnetic poles for explanation, 1E designates a disc portion, and $I_3$ and $III_3$ designate excitation windings mounted on the magnetic poles I and III respectively.

The symbol · written in the symbol ○ given to each excitation winding designates the current flow from the back to the front with respect to the paper, and the symbol × written in the symbol ○ designates the current flow from the front to the back with respect to the paper. Further, the symbol S written on each of the magnetic poles I and III designates an S pole created in the magnetic pole by the aforementioned excitation current, and the symbol N written on the magnetic pole II designates an N pole created in the magnetic pole by the aforementioned excitation current. That is, magnetism is generated even in magnetic poles with no excitation winding by currents in the excitation windings of adjacent magnetic poles.

Figures 11, 12:
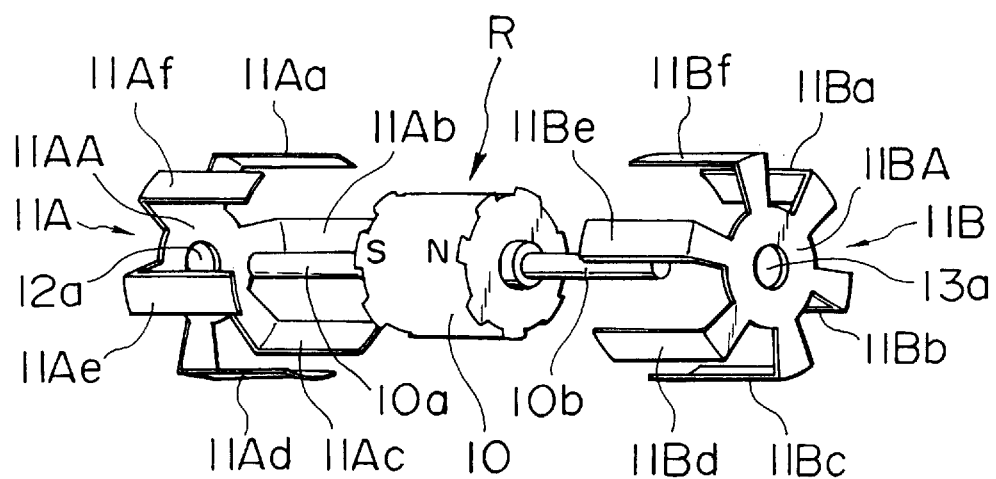
FIG. 11 is a view of excitation sequence for explaining the operation of Embodiment 5.
FIG. 12 is an exploded perspective view of a rotor for explaining Embodiment 6.

Accordingly, this electric rotating machine rotates when three-phase excitation is performed as shown in FIG. 11.

FIG. 11 shows an example of a driving sequence up to the step 7 in the case of three-phase excitation for the electric rotating machine configured as described above. In FIG. 11, the numbers 2-I to 2-III indicating the order of arrangement of the three windings are written in the row, and the excitation step numbers 1 to 7 are written in the column. In the respective frames of intersection between the column and the row, the symbol + represents excitation current supply to excitation windings in a predetermined direction defined correspondingly to the winding direction of the excitation windings provided in the electric rotating machine and correspondingly to the direction of the rotation of the electric rotating machine, and the symbol − represents excitation current supply in a direction reverse to the defined direction.

That is, in the step 1, an excitation current is supplied to the excitation winding of the magnetic pole 2-I in the + direction, and an excitation current is supplied to the excitation windings of the magnetic poles 2-II and 2-III in the − direction. In and after the step 2, excitation currents are switched as shown in FIG. 11, so that the rotor of the electric rotating machine steps by a step angle determined in accordance with the configuration.

Embodiment 6

Another example of the structure of the rotor of the electric rotating machine will be described with reference to FIG. 12. The rotor shown in Embodiment 6 corresponds, in shape or the like, to the various rotors described in Embodiments 1 through 5, and the description about the rotor will be omitted in this embodiment.

In FIG. 12 which is a perspective view showing the rotor R of Embodiment 6 before assembling, the reference numeral 10 designates a cylindrical permanent magnet having rotation shafts 10a and 10b in its opposite ends. The permanent magnet is magnetized in the direction of the rotation shaft. For example, the 10a side and 10b side are magnetized to the S and N poles respectively.

The reference numerals 11A and 11B designate rotor iron cores having claw pole portions which are bent perpendicularly from the disc portions 11AA and 11BA respectively and which are half the number of required pole teeth (twice of the number of permanent-magnet pole pairs shown in Embodiments 1 through 5).

In this embodiment, six claw pole portions 11Aa to 11Af are provided on the rotor iron core 11A, and six claw pole portions 11Ba to 11Bf are provided on the rotor iron core 11B. A hole 12a into which the rotation shaft 10a is attached through a shaft bearing (not shown) is provided in the center portion of the disc portion 11AA of the rotor iron cores 11A. A hole 13a into which the rotation shaft 10b is attached through a shaft bearing (not shown) is provided in the center portion of the disc portion 11BA of the rotor iron cores 11B.

That is, in FIG. 12, the rotation shaft 10a is inserted into the hole 12a of the rotator iron cores 11A to thereby fix the rotor iron cores 11A to the permanent magnet 10. Accordingly, each of the claw pole portions 11Aa to 11Af on the rotor iron cores 11A is magnetized to the S pole identically with the S pole of the permanent magnet 10. Similarly, the rotation shaft 10b is inserted into the hole 13a of the rotator iron cores 11B to thereby fix the rotor iron cores 11B to the permanent magnet 10. Accordingly, each of the claw pole portions 11Ba to 11Bf on the rotor iron cores 11B is magnetized to the N pole identically with the N pole of the permanent magnet 10.

Accordingly, magnetized magnetic pole pairs of the number corresponding to the number of claw pole portions 11Aa to 11Af, 11Ba to 11Bf provided in the respective magnetic pole portions 11A, 11B are formed in this rotor.

An electric rotating machine is completed by assembling the aforementioned rotor into the stator as described above. With the rotation of this rotor, N and S poles alternately pass through the front of magnetic poles of the stator, so that the electric rotating machine rotates in the same manner as in the aforementioned embodiments.

That is, when, in a predetermined step, an excitation current is supplied to excitation windings of the stator not shown, magnetic poles having corresponding magnetism of the rotor are attracted by magnetism created in the respective magnetic poles of the stator to thereby continue rotation.

The electric rotating machine in which the aforementioned rotor is used is similar to the permanent-magnet electric rotating machine described in Embodiments 1 through 5 which uses a rotor having magnetic poles formed by a permanent magnet alternately magnetized to N and S poles in the direction of rotation or a rotor having functions equivalent thereto. If a rotor having such a structure that used in a conventional hybrid electric rotating machine in which disc-like rotor iron plates each having pole teeth provided on the circumference thereof are attached on opposite sides of a permanent magnet magnetized in the direction of the axis of rotation is used in order to increase the number of magnetic poles in the rotor, the counter area between the stator magnetic poles and the rotor magnetic poles is undesirably reduced to a half or less. By the aforementioned means in this embodiment, however, it is possible to constitute an electric rotating machine equivalent to a hybrid electric rotating machine which makes the best use of the counter area between the stator magnetic poles and the rotor magnetic poles.

Embodiment 7

Next, Embodiment 7 different in configuration from the aforementioned embodiments will be described. The configuration thereof, however, will be described only with reference to FIG. 13 which is an assembled sectional view, because the features of Embodiment 7, the producing method, and so on, can be understood easily when the aforementioned embodiments are referred to. Accordingly, in FIG. 13, constitutional parts the same as or equivalent to those shown in the respective drawings used for the description of the aforementioned embodiments are referenced correspondingly.

Figure 13:
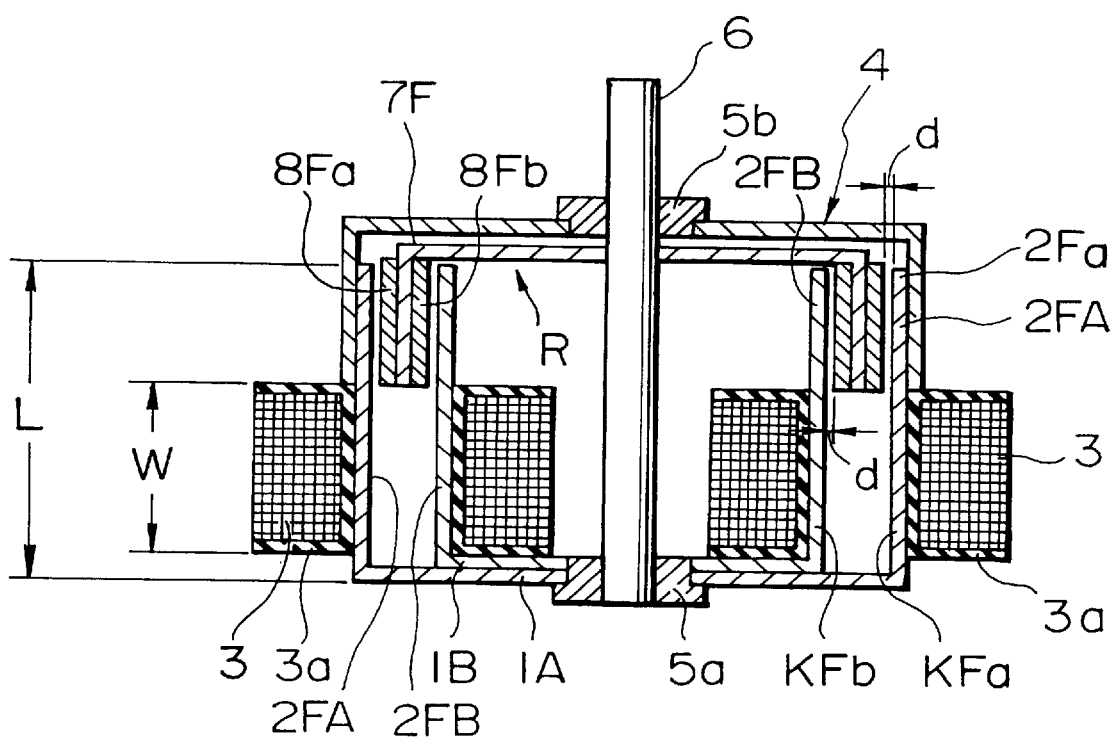
FIG. 13 is a side sectional view of the three-phase permanent-magnet electric rotating machine for explaining the structure of Embodiment 7.

In FIG. 13, KFa designates a first stator iron core, and KFb designates a second stator iron core.

Each of the stator iron cores is formed from a plate of a magnetic substance having a predetermined thickness in the same manner as in the aforementioned embodiment. The first stator iron core KFa has 3n magnetic poles 2FA erected perpendicularly from the disc portion 1A, preferably at circumferentially equal pitches. The second stator iron core KFb has magnetic poles 2FB, of the same number as in the first stator iron core KFa, erected perpendicularly from the disc portion 1B in the same position as in the first stator iron core KFa. That is, the magnetic poles 2FA and 2FB are arranged such that, for example, each pair of the magnetic poles 2FA and 2FB which are to be excited by one and the same excitation winding are disposed to come into opposition respectively to a pair of permanent magnets 8Fa and 8Fb having polarities identical with each other. Accordingly, if the pair of permanent magnets 8Fa and 8Fb which are disposed radially are magnetized in the polarities identical with each other, the magnetic poles 2FA and 2FB are disposed in the same position.

Accordingly, each pair of magnetic poles 2FA and 2FB are united into one so that a bobbin 3a wound with an excitation winding 3 having a width W substantially half the length L of the magnetic pole is fitted onto the each pair of magnetic poles 2FA and 2FB.

Further, the top end portion 2Fa of the first stator iron core KFa is fixedly connected to an inner surface of the cylindrical portion of a cup-like non-magnetic end plate 4.

A shaft bearing 5a is fixed in the center portion of the disc portions of the first and second stator iron cores KFa and KFb and a shaft bearing 5b is fixed in the center portion of the end plate 4 so that the rotation shaft 6 is rotatably supported by the two shaft bearings 5a and 5b.

A rotor R of a predetermined shape is fixed onto the rotation shaft 6. The rotor R has a plurality of axially elongated permanent magnets 8Fa and 8Fb (or equivalent functions) which are designed so that a predetermined number of pairs of N and S poles are formed alternately in the direction of the rotation on each of the opposite surfaces of a back yoke 7F obtained by annularly forming a flat plate of a magnetic substance which constitutes a rotation hub. The magnets 8Fa and 8Fb on the opposite surfaces of the back yoke 7F of the rotor R are arranged so as to be opposite to the respective top end portions of the first and second stator iron cores KFa and KFb above the bobbins 3a with the excitation windings 3 wound thereon while maintaining a predetermined gap d between the magnets 8Fa and the first stator iron core KFa and between the magnets 8Fb and the second stator iron core KFb.

In this embodiment, like the aforementioned embodiment, the number n of magnetic poles may be set to an even number so that the winding is mounted onto every other magnetic pole, or pole teeth may be provided on the magnetic poles so that the number of permanent-magnet pole pairs formed in the rotor corresponds to the number of pole teeth.

Although the aforementioned embodiments have shown several examples for realizing the technical thought of the present invention, it is a matter of course that suitable applications and changes may be made correspondingly to the purpose of use of the electric rotating machine, the rotational speed and required torque suited to the purpose, the electric source condition suited to the situation, or the like.

Although embodiments in which excitation windings are applied to magnetic poles respectively have been described upon the cases of three poles and six poles as an example, the present invention can be applied to any case if the number of magnetic poles is 3n in which n is an integer not smaller than 1. Although embodiments in which the excitation winding is mounted onto every other magnetic pole have been described upon the case of six poles, the technical thought of the present invention can be applied to any case if the number of magnetic poles is 3n in which n is an even number not smaller than 2.

Although the above description has been made upon the case where stator iron cores are formed, for example, by bending a plate of a magnetic substance cut into a predetermined shape in order to configure the electric rotating machine based on the aforementioned technical thought, a laminated plate of magnetic substances may be used or molded dust iron cores may be used, that is, any suitable material to be processed or any processing method may be selected and executed.

Embodiment 8

Figure 14:
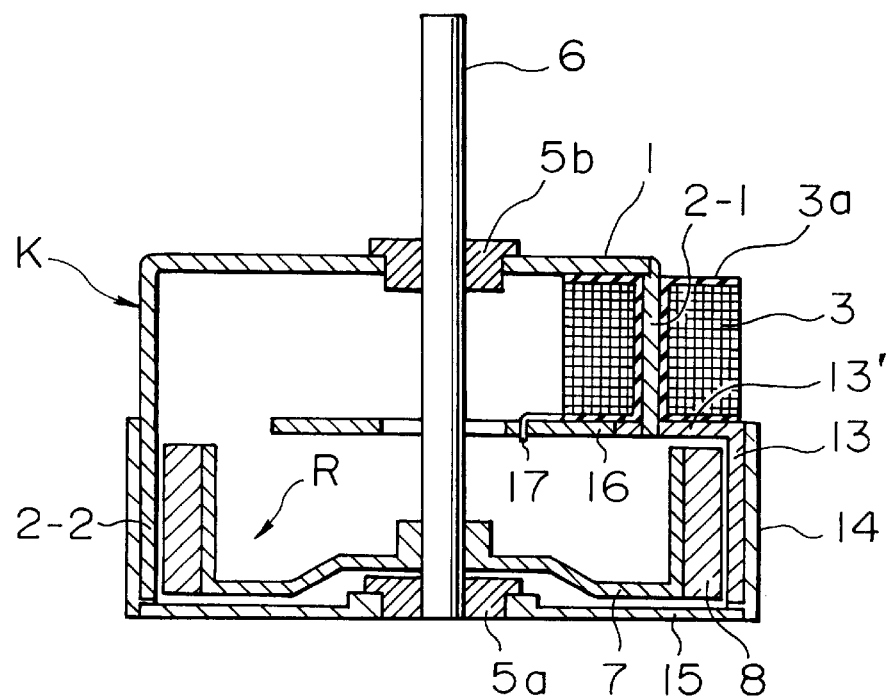
FIG. 14 is a side sectional view showing the structure of Embodiment 8.
Figure 15:
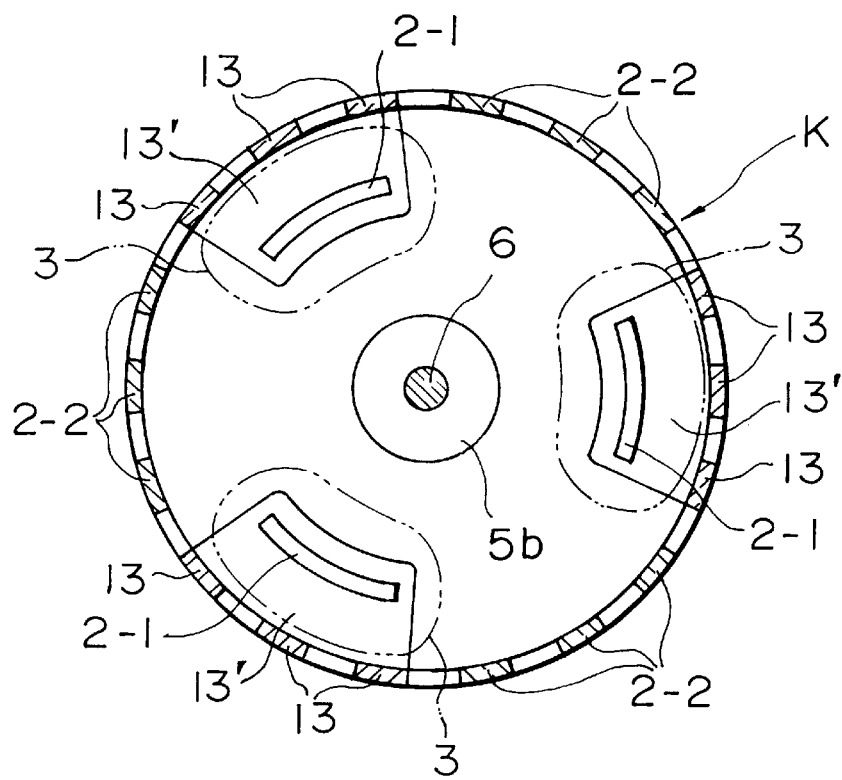
FIG. 15 is a main portion sectional;l view showing the arrangement of the constitutional parts when viewed from the stator of FIG. 14.

FIG. 14 is a sectional view parallel with the rotation shaft, showing Embodiment 8 of the present invention. In the structure shown in FIGS. 1, 9, 13 or the like, the stator iron core is simple. It is however apparent, for example, from FIG. 9 that the structure has disadvantages that windings project out of the external diameter of the magnetic pole portions of the stator iron core, and that temperature rise occurs because the amount of copper in the windings is small due to the limitation that the windings cannot be wound except the inside of space portions between the magnetic portions of the stator. The Embodiment 8 shown in FIG. 14 improves the disadvantages though the structure of the iron core is more or less complex. FIG. 15 is a view when only the stator is viewed from the direction of the rotation shaft in FIG. 14.

In FIG. 14 et seq., the parts the same as or equivalent to those in FIG. 1 are referenced correspondingly, and description about those parts will be omitted. As shown in FIG. 15, three excitation windings 3 are mounted on three magnetic poles 2-1, respectively, which are provided at intervals of about 120° and bent at right angles from the disc portion 1 of the stator iron core K. Ends of these three magnetic poles 2-1 are magnetically connected to three claw pole portions 13 respectively. Similarly, end portions of three magnetic poles 2—2 which are disposed between the magnetic poles 2-1 and on which windings are not mounted are directly integrally formed so as to extend as stator claw pole portions which are disposed substantially intermediate portions between the aforementioned three claw pole portions 13. The transmission of magnetic flux from permanent magnets 8 of the rotor R to the stator iron core K through the air gap is made in the same manner as in FIG. 1.

That is, Embodiment 8 shown in FIGS. 14 and 15 is obtained by improving the embodiment having claw poles as shown in FIG. 7 to increase the amount of copper in the three windings 3 as shown in FIG. 9 to thereby arrange these three windings 3 in the same external diameter as that of the stator iron core K so that these three windings 3 do not project out of the external diameter of the stator iron core K. That is, this embodiment is designed so that the three magnetic poles 2-1 of the stator iron core K on which windings 3 will be mounted respectively are arranged so as to be moved concentrically in the direction of the internal diameter thereof. Therefore, if the claw pole portions 13 are initially integrally formed at ends of the magnetic poles 2-1 of the stator iron core K on which windings will be mounted respectively, the windings 3 cannot be mounted on the magnetic poles 2-1 after the claw pole portions 13 are formed. Accordingly, the magnetic poles 2—2 of the stator iron core K on which windings 3 are not mounted are extended directly in the axial direction in the outermost diameter portion of the disc portion 1 of the iron core K to integrally form claw pole portions whereas the three magnetic poles 2-1 on which windings 3 are mounted are designed so that the claw pole portions 13 provided separately are magnetically and mechanically connected as shown in FIGS. 14 and 15 after the windings 3 are mounted on the magnetic poles 2-1. Accordingly, though the embodiment shown in FIGS. 14 and 15 is a little complex in construction compared with the embodiment shown in FIG. 1 or the like, not only the amount of copper in the windings can be increased by several times but also the windings are prevented from projecting out of the outer circumference of the stator iron core K.

Further, as shown in FIG. 14, a cover and support constituted by a cylindrical portion 14 and a disc portion 15 formed from a nonmagnetic substance is provided so that the claw pole portions 13 magnetically and mechanically connected to the magnetic poles 2-1 of the stator iron core K and the claw pole portions integrally extended from the magnetic poles 2—2 are fixed and supported in the inner surface of the cylindrical portion 14. Further, a shaft bearing 5a is provided in the center of the disc portion 15, so that a rotation shaft 6 is rotatably supported by the shaft bearing 5a and a shaft bearing 5b provided in the disc portion 1 of the stator. Like the aforementioned respective embodiments, a cup-shaped back yoke 7 is fixed to the rotation shaft 6 and permanent magnets 8 are fixed to the outer circumferential portion of the cylindrical portion of the back yoke 7 so as to be opposite to the aforementioned claw pole portions through predetermined air gaps respectively. Incidentally, the reference numeral 16 designates a printed wiring substrate; and 17, a power supply pin which is soldered together with the printed wiring substrate 16.

Embodiment 9

Figure 16:
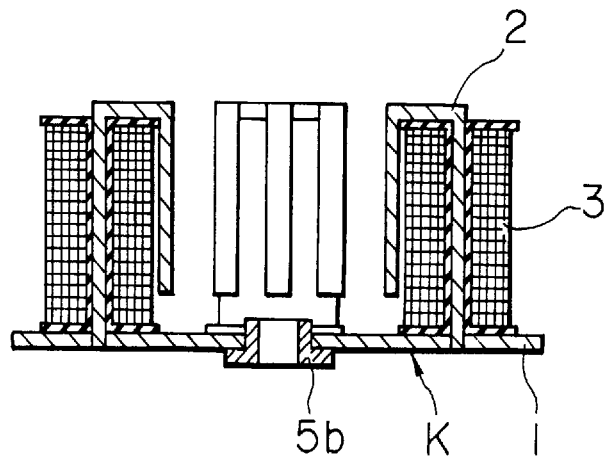
FIG. 16 is a side sectional view of the rotor in the structure of Embodiment 9.

FIG. 16 is a sectional view parallel with the shaft of the stator, showing Embodiment 9 of the present invention. The stator iron core K is constituted by a disc portion 1 of a magnetic substance serving also as a magnetic path, and a number (multiples of 3) of magnetic pole portions 2. A shaft bearing 5b is fixed in the center of the disc portion 1. Each of the magnetic pole portions 2 is formed of a magnetic iron plate which is bent so as to be U-shaped. The magnetic pole portions 2 are concentrically fixed to the disc portion 1 after windings 3 are mounted on the magnetic pole portions 2 respectively. The inner circumferential sides of the magnetic pole portions 2 each of which is bent so as to be U-shaped are formed as claw poles and arranged so as to be opposite to a rotor (not shown) through a predetermined air gap. This embodiment is functionally equivalent to the embodiments shown in FIG. 1, and so on. In this configuration, the windings 3 project out of the external diameter of the magnetic pole portions 2 but the amount of copper in the windings is selected to be sufficiently large compared with the configurations shown in FIG. 1, and so on, so that the inertia of the rotor can be selected to be sufficiently small compared with the external diameter of the motor.

Embodiment 10

Figure 17:
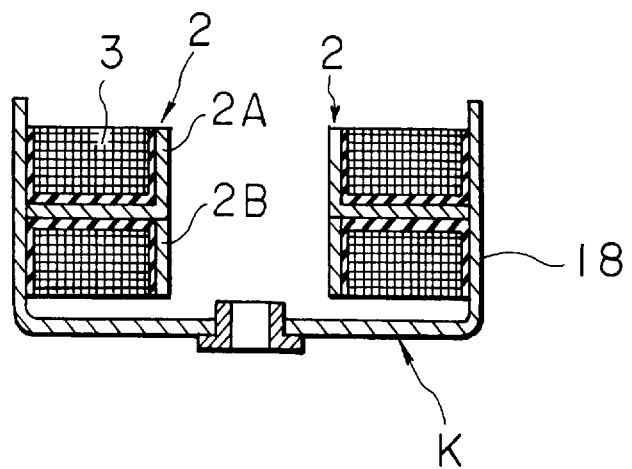
FIG. 17 is a side sectional view of the rotor in the structure of Embodiment 10.

FIG. 17 is a sectional view parallel with the shaft of the stator, showing Embodiment 10 of the present invention. Although the embodiments shown in FIGS. 1, 2, 9, 13, 14, 15, 16, and so on, have shown the case where the axial centers of all windings are parallel with the rotation shaft of the rotor, Embodiment 10 shown in FIG. 17 is different from those embodiments in that the axial centers of windings in this embodiment are arranged in the direction of the radius of the rotor. In this embodiment, the stator iron core K is constituted by a cup-shaped stator housing 18 of a magnetic substance serving also as a magnetic path and a number (multiples of 3) of stator magnetic poles 2 having claw poles 2A and 2B. After windings 3 are mounted on the stator magnetic poles 2, the stator magnetic poles 2 are magnetically connected to the inner circumference of the cylindrical portion of the cup-shaped housing 18 so as to be equalized concentrically. The stator magnetic poles 2 may be fixed to each other by resin molding in the same manner as in FIG. 14 before the windings 3 are mounted on the stator magnetic poles 2 and then the integrated structure of the stator magnetic poles 2 is fixed to the stator housing 18. Incidentally, a shaft bearing 5b for supporting the rotation shaft (not shown) of the rotor is provided in the center of the disc portion of the cup-shaped housing 18.

Figure 18:
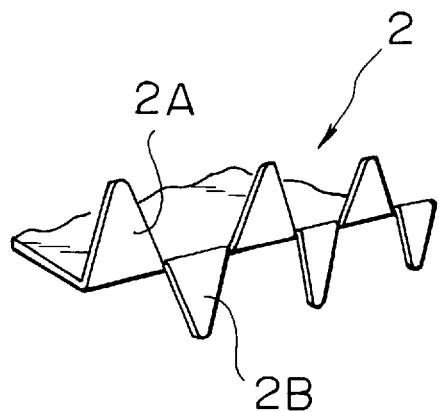
FIG. 18 is a perspective view showing the stator magnetic poles of FIG. 17.

FIG. 18 shows an example of the external appearance of the magnetic poles 2 depicted in FIG. 17 in the case where the magnetic poles 2 are press-formed from one sheet of iron plate. End portions of the magnetic poles 2 are bent up and down alternately to form the claw poles 2A and 2B. After the claw poles 2A and 2B are formed as described above, the windings 3 are mounted on the magnetic poles 2.

Figure 19:
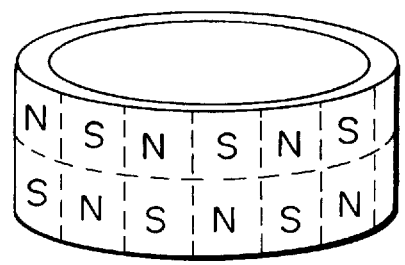
FIG. 19 is a view showing magnetization of the rotor magnet of FIG. 17.

FIG. 19 is a perspective view showing the structure of rotor magnets which are arranged so as to be opposite to the claw poles 2A and 2B (FIG. 18) of the stator magnetic poles 2 depicted in FIG. 17. That is, magnetic flux from the poles of the same polarity among N poles and S poles magnetized in two, upper and lower, stages in the axial direction shown in FIG. 19, for example, the magnetic flux from the upper and lower N poles, enters into the upper and lower claw poles 2A and 2B of one phase shown in FIG. 18 and then the magnetic flux exits from the claw poles 2A and 2B of the magnetic poles 2 of another phase so as to return to the upper and lower S poles of the rotor magnets shown in FIG. 19.

Although this embodiment has shown the case where the claw poles 2A and 2B are formed from one sheet of iron plate, the invention can be applied to the case where two sheets of iron plate are used so that one kind of claw poles 2A are formed from one iron plate bent at right angles and that the thus formed two kinds of claw poles are stuck to each other in a predetermined arrangement so as to be arranged concentrically. The rotor is formed in the same manner as in FIG. 1, or the like.

Embodiment 11

Figure 20:
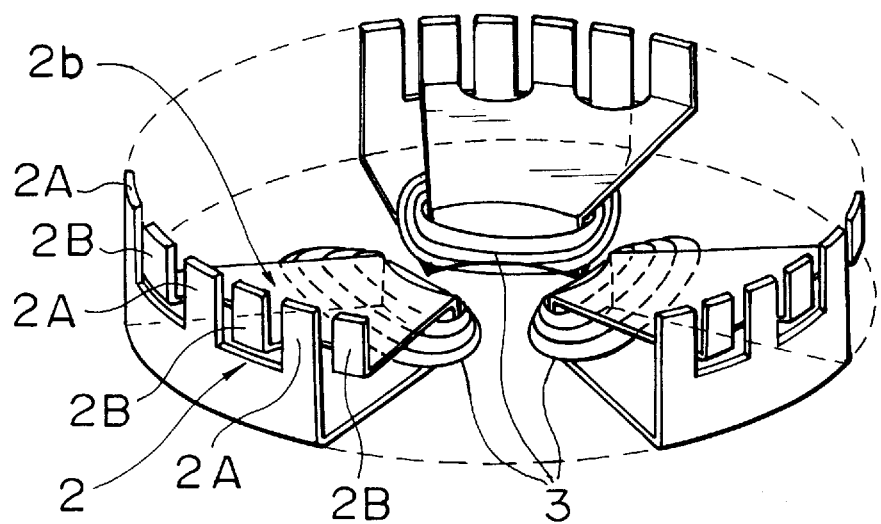
FIG. 20 is a perspective view of the stator in the structure of Embodiment 11.

FIG. 20 is a perspective view showing part of the stator in Embodiment 11 of the present invention. This configuration has a feature in that respective magnetic poles 2 have claw poles 2A and 2B engaged with each other alternately as shown in FIG. 20; that all the top ends of the claw poles 2A and 2B are arranged so as to be oriented in one and the same direction; and that these claw poles 2A and 2B in each phase are magnetized to N and S poles alternately by an excitation winding 3. Incidentally, the rotor may have the same structure as in FIG. 1, or the like. In FIG. 20, the iron core portion provided with the claw poles 2A and the iron core portion provided with the claw poles 2B are formed separately from each other and then these iron core portions are caulked at a proper position to a yoke having the excitation winding 3 mounted thereon or these iron cores having the claw poles 2A and 2B and the yoke having the excitation winding 3 are integrally fixedly molded with resin to thereby constitute the stator portion for every phase.

Embodiment 12

Figure 21A:
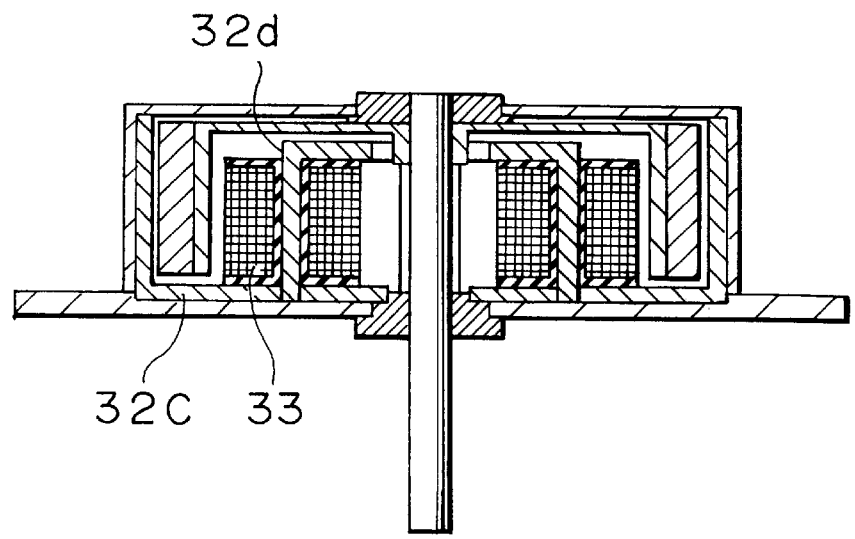
FIG. 21A is side sectional view of the structure of Embodiment 12.
Figure 21B:
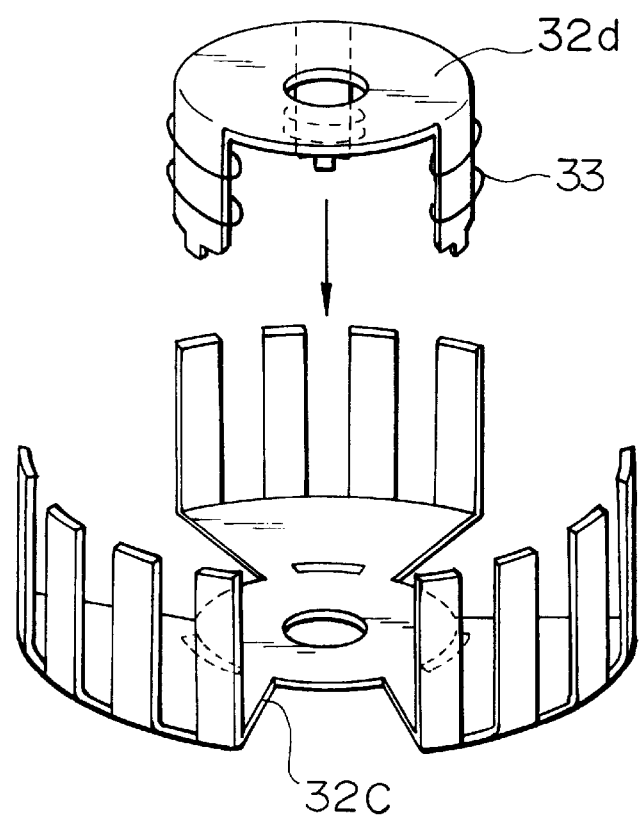
FIG. 21B is an exploded perspective view of the stator of FIG. 21A.

FIG. 21A is side sectional view of the structure of Embodiment 12, and FIG. 21B is an exploded perspective view of the stator of FIG. 21A. The structure of this embodiment has a feature in that the excitation windings are arranged in the inside of the rotor so as to reduce the thickness of the electric rotating machine in the axial direction of the rotor in comparison with that in the embodiments illustrated in FIG. 1 etc. In FIGS. 21A and 21B, the reference numeral 32C designates a stator iron core portion having claw poles. A yoke portion 32d having excitation windings 33 mounted thereon is mechanically and magnetically connected to the stator iron core portion 32C to thereby constitute the stator. In the stator iron core portion 32C, the claw poles are bent at right angles into the axial direction of the rotor so that the rotor having the same structure as that shown in FIG. 1 is disposed to face the claw poles at a predetermined air gap as shown in FIG. 21A. These claw poles are excited by excitation windings 33 mounted on magnetic poles of the yoke portion 32d. Thus, the thickness of the electric rotating machine in the axial direction of the rotor can be reduced.

Embodiment 13

Figure 22A:
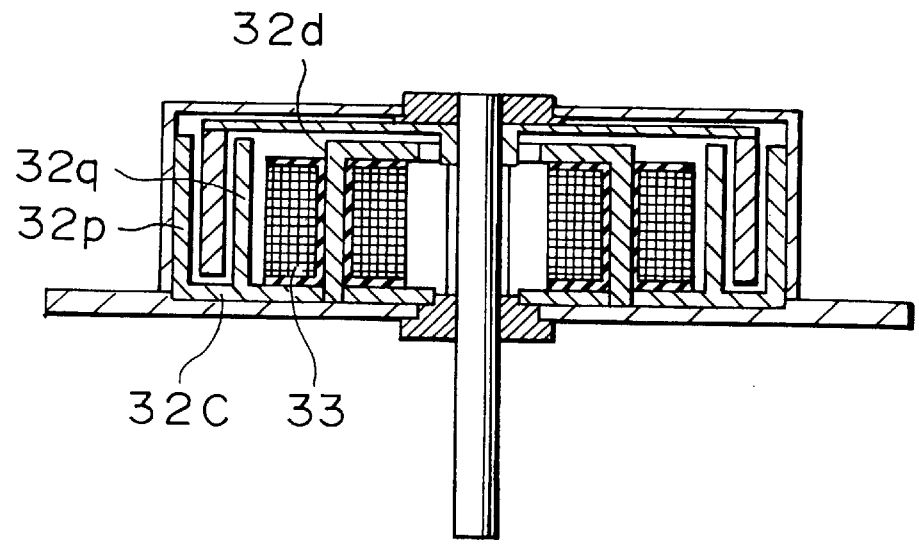
FIG. 22A is side sectional view of the structure of Embodiment 13.
Figure 22B:
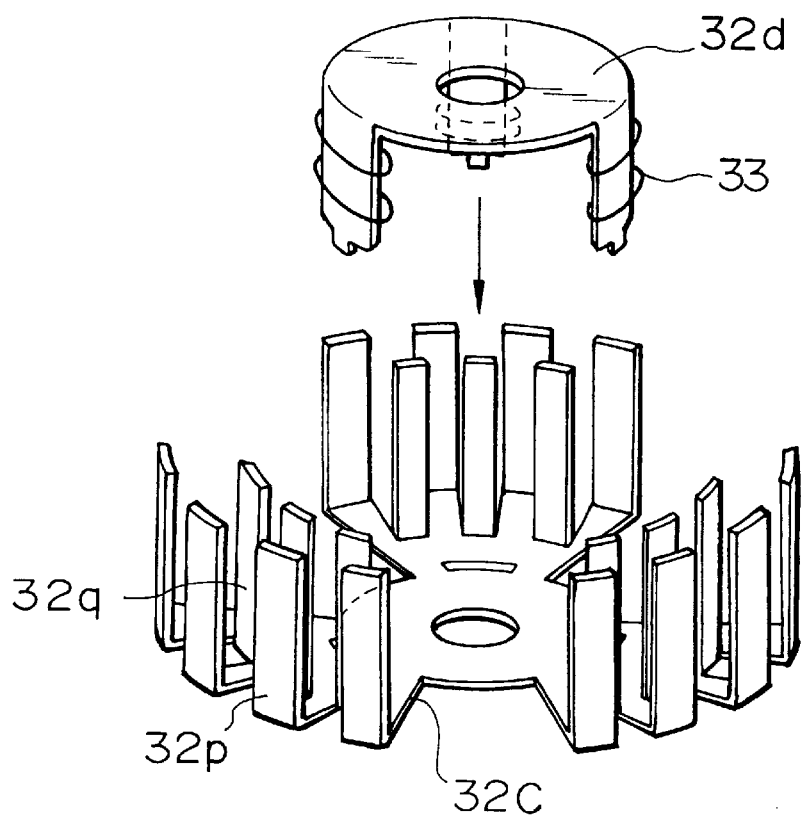
FIG. 22B is an exploded perspective view of the stator of FIG. 22A.
Figure 23:
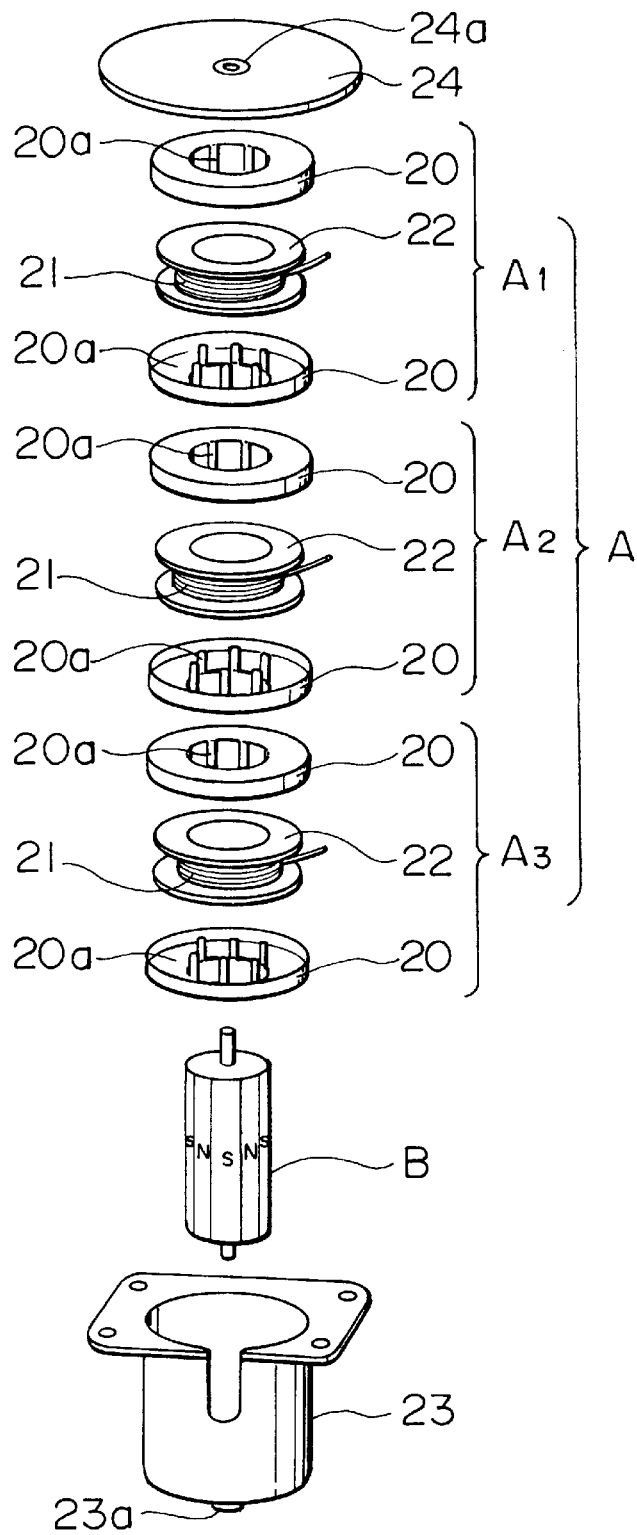
FIG. 23 is an exploded perspective view for explaining a conventional permanent-magnet electric rotating machine.

FIG. 22A is side sectional view of the structure of Embodiment 13, and FIG. 22B is an exploded perspective view of the stator of FIG. 22A. This Embodiment 13 is a modification of the configuration of Embodiment 12 to which the configuration of Embodiment 7 of FIG. 13 is applied. That is, in an electric rotating machine in which 3n excitation windings 33 are arranged in an inside space of a rotor, outer and inner surfaces of an annular yoke portion of the rotor are magnetized so that N and S magnetic poles are arranged alternately in the direction of rotation on each of the outer and inner surfaces of the rotor (not shown in detail). The number of the N and S magnetic on the outer surface is made equal to that of the N and S magnetic poles on the inner surface. On the other hand, in a stator, a claw pole portion of a double claw pole structure in which a first claw poles 32p and a second claw poles 32q are formed on a stator ion core portion 32C, and a yoke portion 32d on which excitation windings 33 are mounted is fixed to the stator iron core portion 32C as shown in FIG. 22B. The thus constituted stator is disposed so that the first and second claw poles 32p and 32q of the stator face the outer and inner magnetized surfaces of the rotor at predetermined air gaps respectively, and the lines of magnetic flux entering the claw poles 32p and 32q of the stator rom the outer and inter magnetized surfaces of the rotor respectively are shorted by a magnetic path of a magnetic substance of the yoke portion 32C after they make interlinkage with the 3n windings 33 (that is, after they passed through the axes of the 3n windings 33). Here, n is an integer not smaller than 1. FIGS. 22A and 22B illustrate a specific example in which the number n is 1, that is, the excitation windings are provided by three in number.

The three-phase permanent-magnet electric rotating machine according to the aforementioned embodiments of the present invention can be manufactured with less parts and with less steps because the stator is configured such that necessary magnetic poles or magnetic teeth are raised from one sheet of plate of magnetic material and windings are mounted on the given magnetic poles. That is, since the stator core can be formed by die-punching and bending one sheet of magnetic material, the number of producing steps can be reduced. Accordingly, since it is possible to integrally form a plurality of magnetic poles including magnetic teeth which are provided if necessary on the top end portions of the magnetic poles, the number of parts is small, and assembling is not required. Accordingly, the cost can be reduced in the material cost as well as conversion cost. Further, since a plurality of magnetic poles and pole teeth can be formed integrally, accuracy in the relative positions of adjacent magnetic poles and pole teeth can be improved. Further, desired accuracy and cost can be balanced when magnetic pole-forming portions before bending are processed into an optimum shape. Further, the stator iron core having the claw poles 32p and 32q of FIGS. 22A and 22B may be formed from two magnetic plates like the stator iron cores KFa and KFb shown in FIG. 13.

Further, in the case where the excitation winding is provided onto every other magnetic pole, even the magnetic pole on which no winding is mounted can be magnetized by the excitation currents supplied to the windings mounted on the magnetic poles adjacent to the magnetic pole having no winding mounted thereon, so that desirable performance can be obtained by a small number of windings. Thus, if magnetic poles with no pole teeth are used in the stator, it s possible to produce an electric rotating machine which is high in revolving speed.

Further, since the excitation circuit can be simplified, the cost can be reduced.

If the top end portion of each of projections bent from a disc portion to form magnetic poles is shaped to be a circular arc having the same curvature radius as that of the disc portion, the top end portion of the magnetic pole after formed can exist in a plane parallel to the disc portion.

In order to form the magnetic poles of the stator, if the pitch of the comb-like teeth on the top end of each of the projections is made to be substantially inversely proportional to the cosine of an angle thereat, the pitch of the pole teeth of the magnetic pole after formed has correctly equal distances. Further, if magnetic poles with pole teeth are provided in the stator, it is possible to produce an electric rotating machine small in step angle and high in revolving accuracy.

Further, in the case where end portions of the magnetic poles are fixed by an end plate of a non-magnetic substance, it is possible to produce an electric rotating machine improved in strength at the time of rotation and higher in accuracy with a simple structure.

Further, in the case where the rotor is constituted by two rotor iron cores having claw-pole-shaped magnetic poles and an axially magnetized permanent magnet which is sandwiched by the two rotor iron cores from axially opposite directions, the electric rotating machine according to the present invention becomes a hybrid electric rotating machine so that the number of the magnetic poles of the rotor can be increased more and the step angle at the time of rotation can be made small. Accordingly, it is possible to obtain an electric rotating machine which is excellent in accuracy of rotation.

Further, in the case where the stator is constituted by two iron cores arranged concentrically and mounted with windings to thereby form double magnetic poles, about two-fold torque can be generated in the electric rotating machine substantially having the same volume (same contour) because the torque is generated as torque of an outer rotor in the double stator structure.

What is claimed is:

1. A three-phase permanent-magnet electric rotating machine comprising:

a stator which includes a stator iron core made from a magnetic material and having a disc portion and 3n (n being an integer not smaller than 1) magnetic poles erected perpendicularly from an outer circumference of said disc portion, said disc portion and said 3n magnetic poles formed from a single sheet of said magnetic material, and excitation windings mounted on said magnetic poles respectively, each of said windings having a predetermined width in an axial direction; and a rotor having a permanent magnet by which a predetermined number of pairs of N and S magnetic poles are formed alternately in a direction of rotation of said rotor and so as to be opposite to said magnetic poles piercing said excitation windings at top end portions of said magnetic poles respectively beyond said excitation windings.

2. A three-phase permanent-magnet electric rotating machine comprising:

a stator which includes a stator iron core made from a magnetic material and having a disc portion and 3n (n being an even number not smaller than 2) magnetic poles erected perpendicularly from an outer circumference of said disc portion, and excitation windings mounted on every other one of said magnetic poles, each of said windings having a predetermined width in an axial direction; and a rotor provided with permanent magnets by which a predetermined number of pairs of N and S magnetic poles are formed alternately in a direction of rotation of said rotor and so as to be opposite to said magnetic poles piercing said excitation windings at top end portions of said magnetic poles respectively beyond said excitation windings.

3. A three-phase permanent-magnet electric rotating machine comprising:

a stator which includes: a first stator iron core made from a magnetic material, and having a first disc portion, and 3n (n being an even number not smaller than 2) first magnetic poles erected perpendicularly from an outer circumference of said first disc portion; a second stator iron core made from a magnetic material, and having a second disc portion having a diameter which is smaller than a diameter of said first disc portion, and 3n second magnetic poles erected perpendicularly from an outer circumference of said second disc portion so that said 3n second stator iron cores are disposed concentrically with said 3n first magnetic poles; and excitation windings mounted on every other one of said 3n pairs of said first and second magnetic poles, each of said windings having a predetermined width in an axial direction; and a rotor having outer and inner circumferential surfaces on each of which a predetermined number of pairs of N and S magnetic poles are alternatively formed by permanent magnets in a direction of rotation of said rotor, said rotor being rotatably supported so that said pairs of N and S magnetic poles provided on said outer and inner circumferential surfaces of said rotor face said first poles and said second poles at predetermined air gaps respectively at top end portions of said first magnetic poles of said first stator iron core and said second magnetic poles of said second stator iron core beyond positions where said excitation windings are mounted.

4. A three-phase permanent-magnet electric rotating machine comprising:

a stator including: a disc portion of a magnetic substance; 3n (n being an integer not smaller than 1) magnetic poles each of which is formed from a magnetic substance and bent like a U-shape so that each of said magnetic poles has long and short sides parallel with each other and a side connecting said long and short sides to each other, free ends of said long sides of said respective magnetic poles being magnetically and mechanically connected to said disc portion so as to be erected perpendicularly to said disc portion at its outer circumferential portion, said short sides of said respective magnetic poles being arranged as claw poles and said short sides being located closer to a rotor than said long sides; and excitation windings mounted on said magnetic poles, each of said windings having a predetermined width in an axial direction; and the rotor constituted by permanent magnets so that a predetermined number of pairs of S and N magnetic poles are arranged alternately in a direction of rotation of said rotor so as to face said claw poles of said magnetic poles through a predetermined air gap.

5. A three-phase permanent-magnet electric rotating machine comprising:

a stator including: a disc portion of a magnetic substance; 3n (n being an even number not smaller than 2) magnetic poles each of which is formed from a magnetic substance and bent like a U-shape so that each of said magnetic poles has long and short sides parallel with each other and a side connecting said long and short sides to each other, free ends of said long sides of said respective magnetic poles being magnetically and mechanically connected to said disc portion so as to be erected perpendicularly to said disc portion at its outer circumferential portion, said short sides of said respective magnetic poles being arranged as claw poles and said short sides being located closer to a rotor than said long sides; and excitation windings mounted on every other one of said magnetic poles, each of said windings having a predetermined width in an axial direction; and the rotor constituted by permanent magnets so that a predetermined number of pairs of S and N magnetic poles are arranged alternately in a direction of rotation of said rotor so as to face said claw poles of said magnetic poles through a predetermined air gap.

6. A three-phase permanent-magnet electric rotating machine according to any one of claims 1, 2 or 3, wherein pole teeth are formed on a top end portion of each of said magnetic poles by providing a plurality of slots in a predetermined shape in said top end portion.

7. A three-phase permanent-magnet electric rotating machine according to any one of claims 1–2 and 4–5, wherein said top end portions of said magnetic poles formed in the stator iron core are fixedly held by an end plate of a non-magnetic substance so that said rotor is rotatably supported by shaft bearings provided in a center portion of said end plate and in a center portion of a disc portion constituting said stator, respectively.

8. A three-phase permanent-magnet electric rotating machine according to any one of claims 1–2 and 4–5, wherein said rotor includes an axially magnetized cylindrical permanent magnet, and first and second rotor iron cores each of which has a predetermined number of claw-pole-shaped magnetic poles formed at intervals of a predetermined pitch and integrally fixed at their one ends, said first and second rotor iron cores being coupled with said cylindrical permanent magnet from axially opposite sides of said cylindrical permanent magnet so that said magnetic poles of said first rotor iron core and said magnetic poles of said second rotor iron core are disposed side by side alternately in the direction of rotation of said rotor and so that said magnetic poles of said first rotor iron core and said magnetic poles of said second rotor iron core are formed to be N and S magnetic poles respectively.

9. A three-phase permanent-magnet electric rotating machine according to claim 1, wherein each of said stator magnetic poles has a plurality of claw-poles.

10. A three-phase permanent-magnet electric rotating machine according to claim 2, wherein the magnetic poles on which said windings of said stator are mounted respectively are arranged so as to be concentric with the magnetic poles on which said windings are not mounted and so as to be located radially inner side than the magnetic poles on which said windings are not mounted; the magnetic poles on which said windings are not mounted are integrally extended directly in a axial direction of rotation of said rotor to thereby form first claw poles; second claw poles formed separately are magnetically and mechanically connected to the respective magnetic poles on which said windings are mounted; said first claw poles and said second claw poles are arranged on one and the same circle; and said rotor is rotatably supported so as to face said first and second claw poles.

11. A three-phase permanent-magnet electric rotating machine according to claim 2, wherein said disc portion and said 3n magnetic poles were formed from a single sheet of said magnetic material.

12. A three-phase permanent-magnet electric rotating machine according to claim 11, wherein each of said stator magnetic poles has a plurality of claw-poles.

* * * * *